United States Patent

[11] 3,587,125

| [72] | Inventors | Royal R. McLeese<br>Bloomfield Township;<br>Carl N. Mortenson, Midland, Mich. |
|------|-----------|------|
| [21] | Appl. No. | 756,666 |
| [22] | Filed | Aug. 30, 1968 |
| [45] | Patented | June 28, 1971 |
| [73] | Assignee | Magline, Inc., Pinconning, Mich. |

[54] SECTIONAL SPANNING BEAM AND END SUPPORTS
19 Claims, 21 Drawing Figs.

[52] U.S. Cl............................................ 14/6, 52/637, 182/179
[51] Int. Cl........................................... E01d 9/00
[50] Field of Search............................. 14/1, 6; 52/223, 226, 637, 638, 646, 644, 691; 182/118, 119

[56] References Cited
UNITED STATES PATENTS

| 379,217 | 3/1888 | Green | 52/223X |
| 779,298 | 1/1905 | Miller | 14/5 |
| 1,302,293 | 4/1919 | Blazer | 52/223 |
| 2,376,023 | 5/1945 | Bailey | 14/13 |
| 2,985,264 | 5/1961 | Leonard | 52/223X |
| 3,010,257 | 11/1961 | Naillon | 14/6X |
| 3,140,764 | 7/1964 | Cheskin | 52/223 |
| 3,245,188 | 4/1966 | Evans | 52/638 |

Primary Examiner—Jacob L. Nackenoff
Attorney—Harness, Dickey and Pierce

ABSTRACT: The beam is made from lightweight extruded square tubing to form a plurality of braced sections releasably joined together at their abutted ends to form a span of considerable length. The bottom runs of the sections contain a tension cable for reducing the static deflection, dampening the springboard effect, carrying a substantial portion of the tensile load and providing safety.

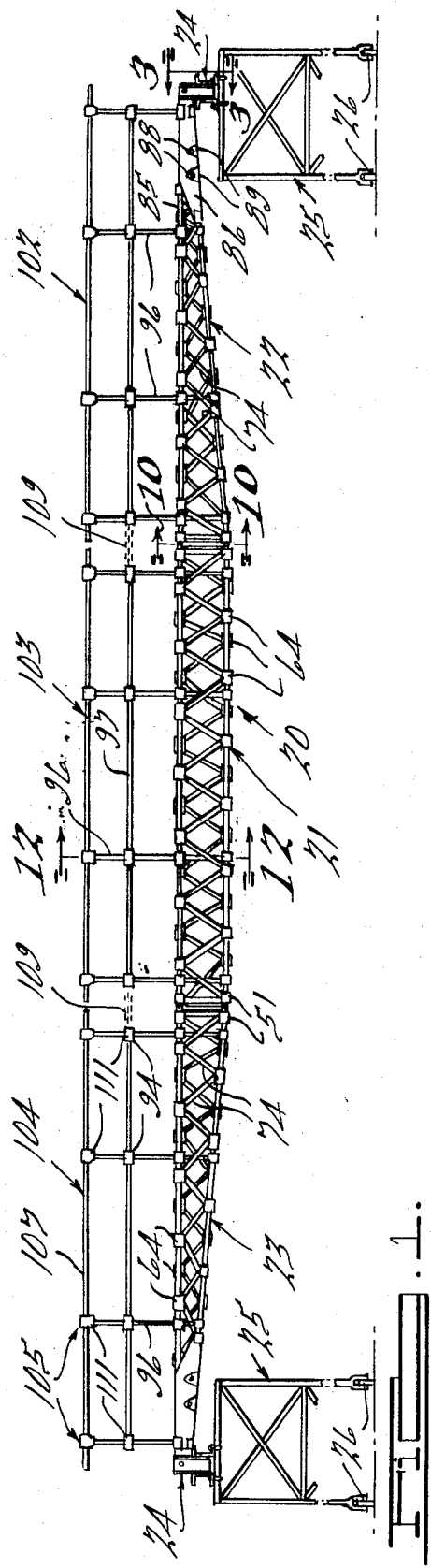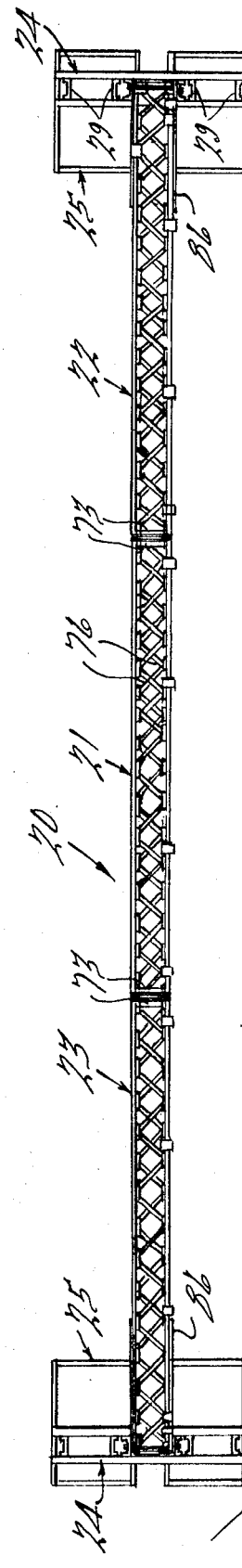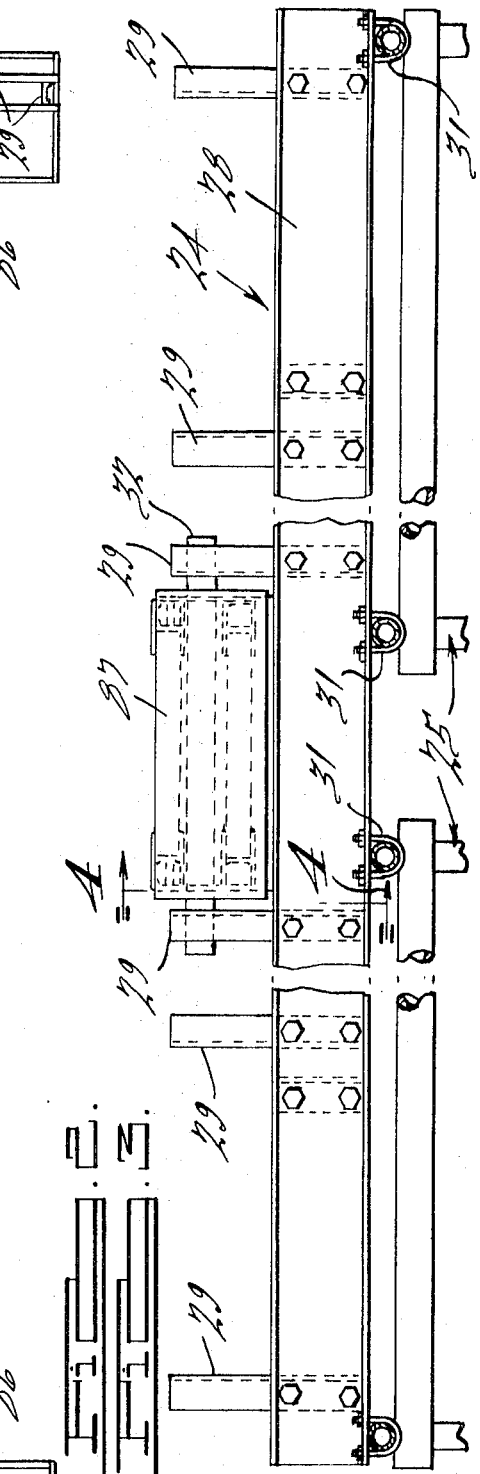

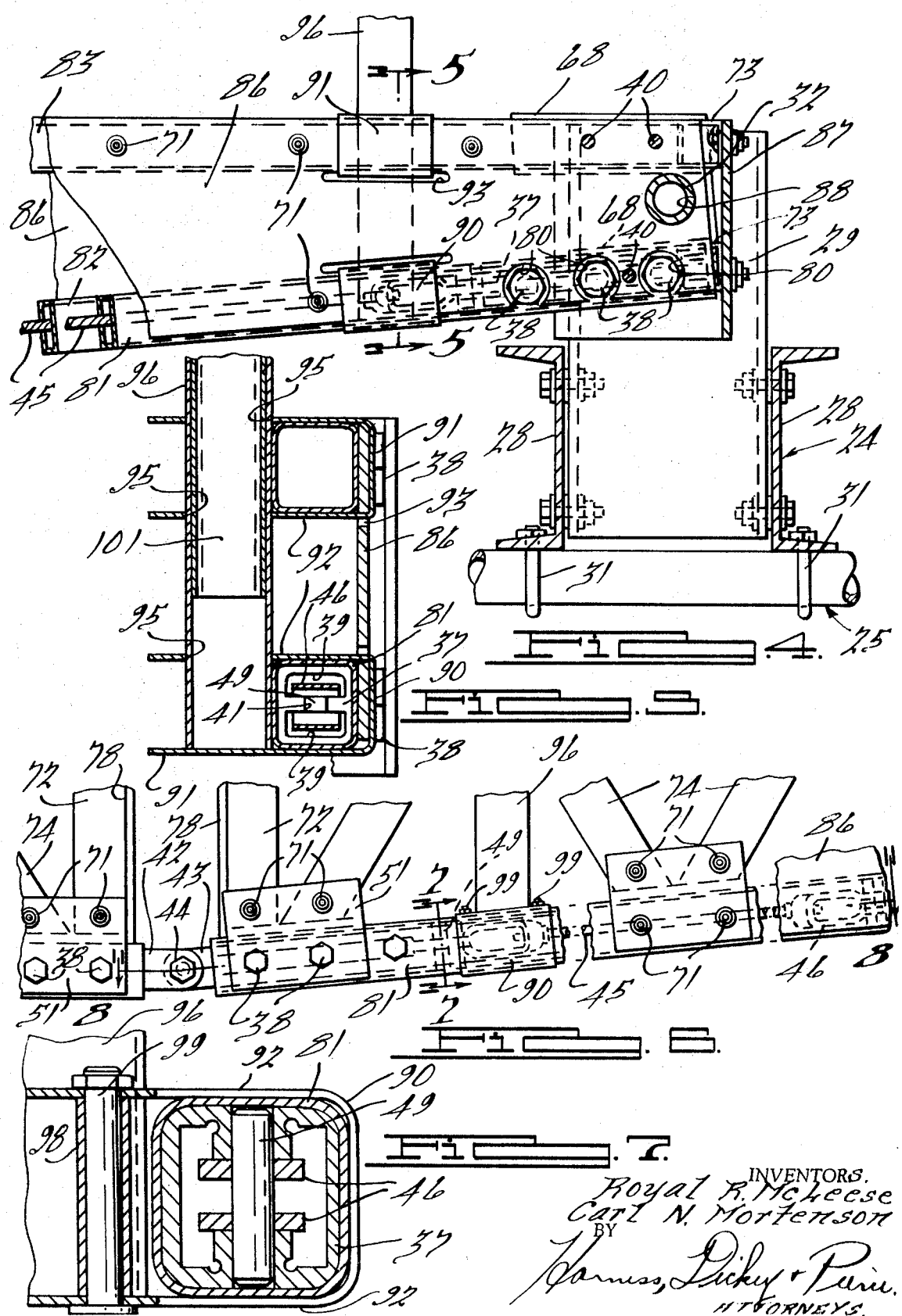

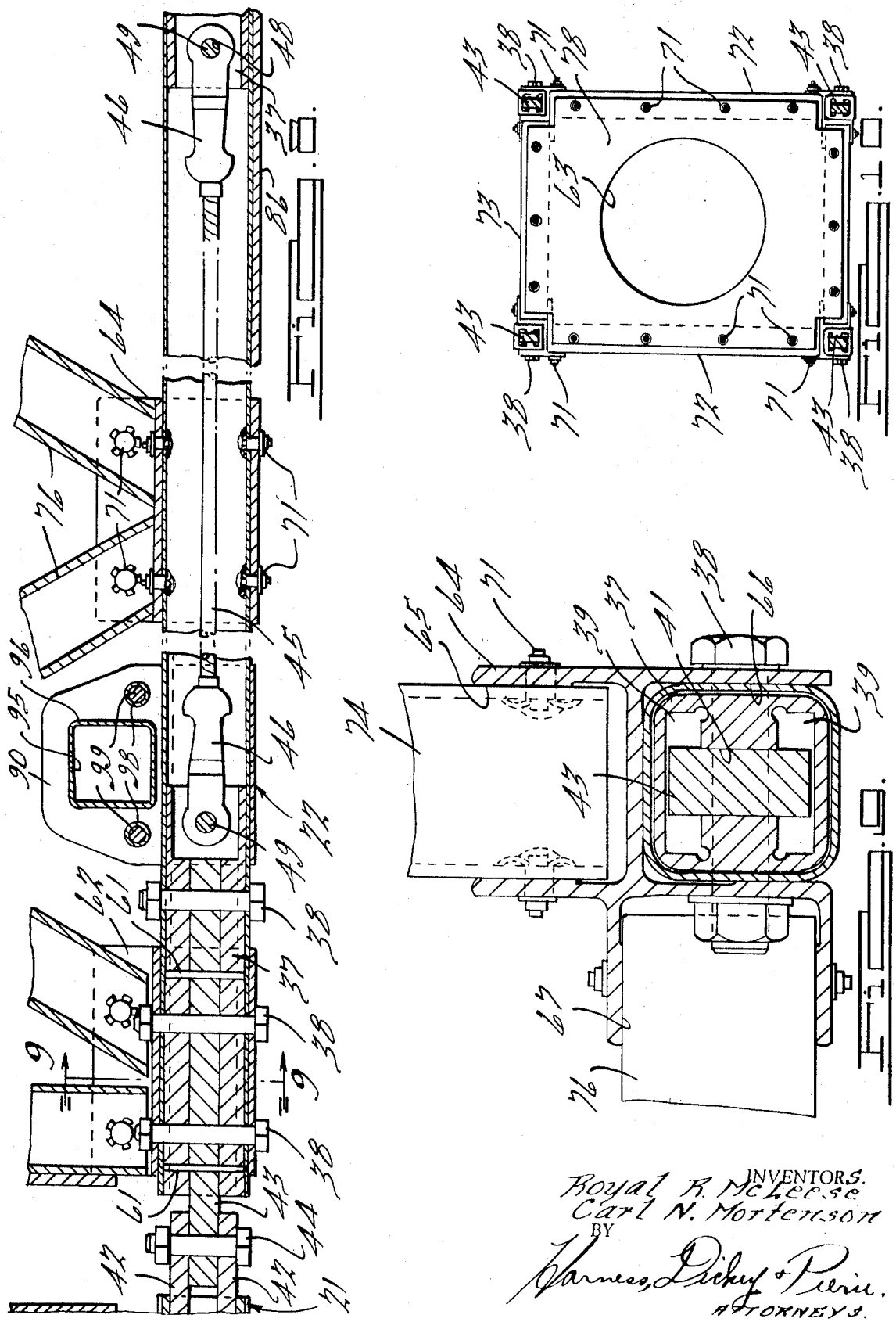

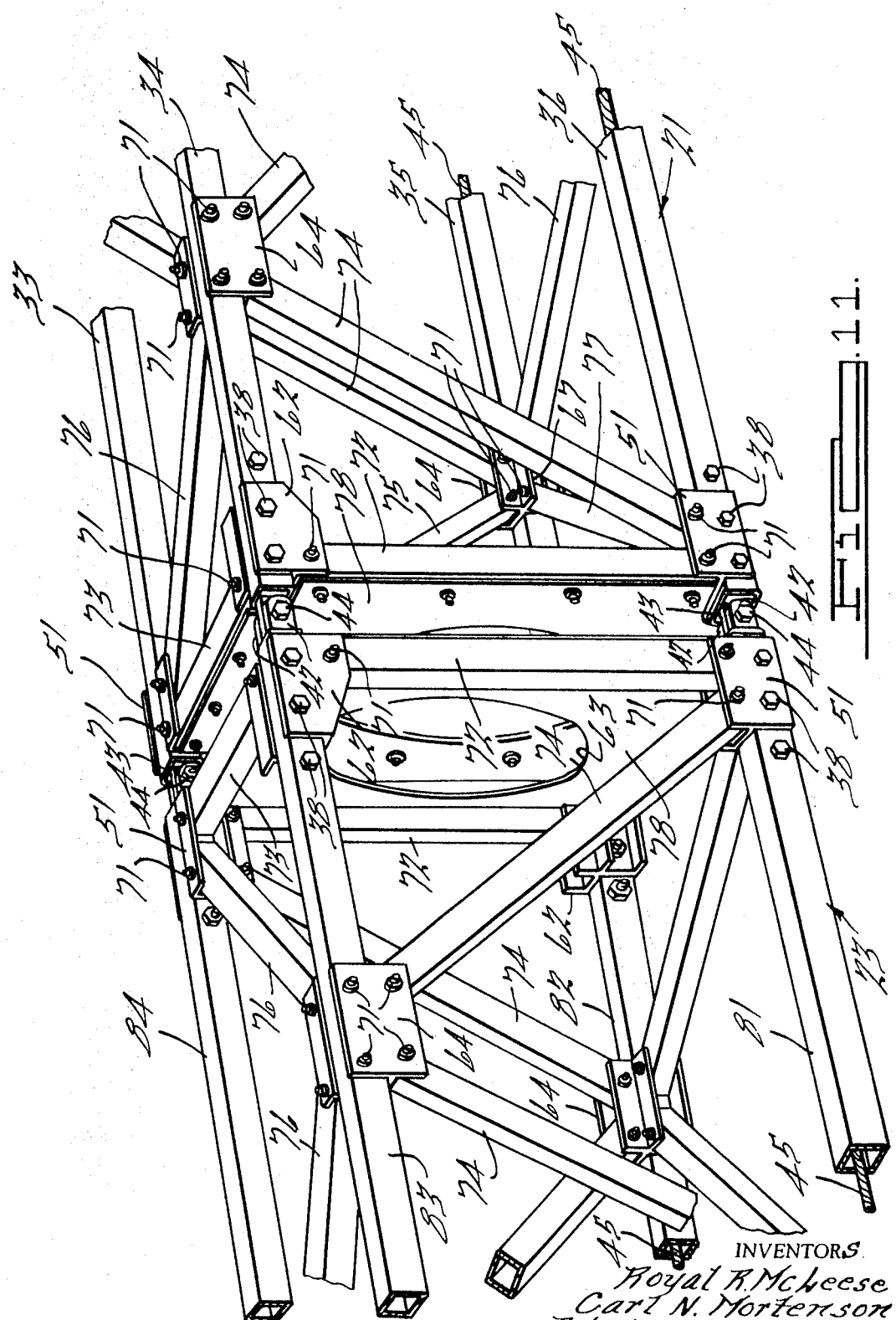

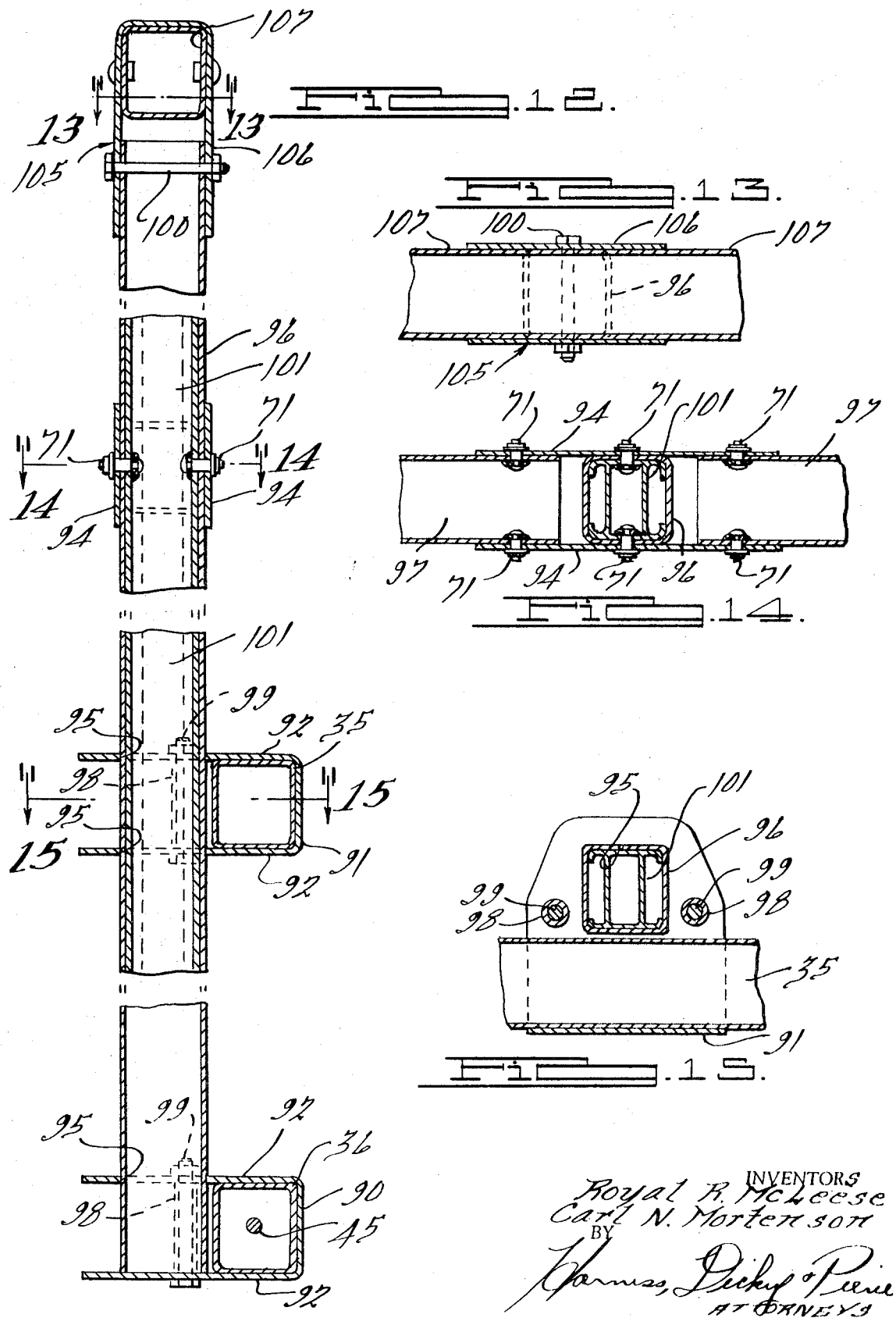

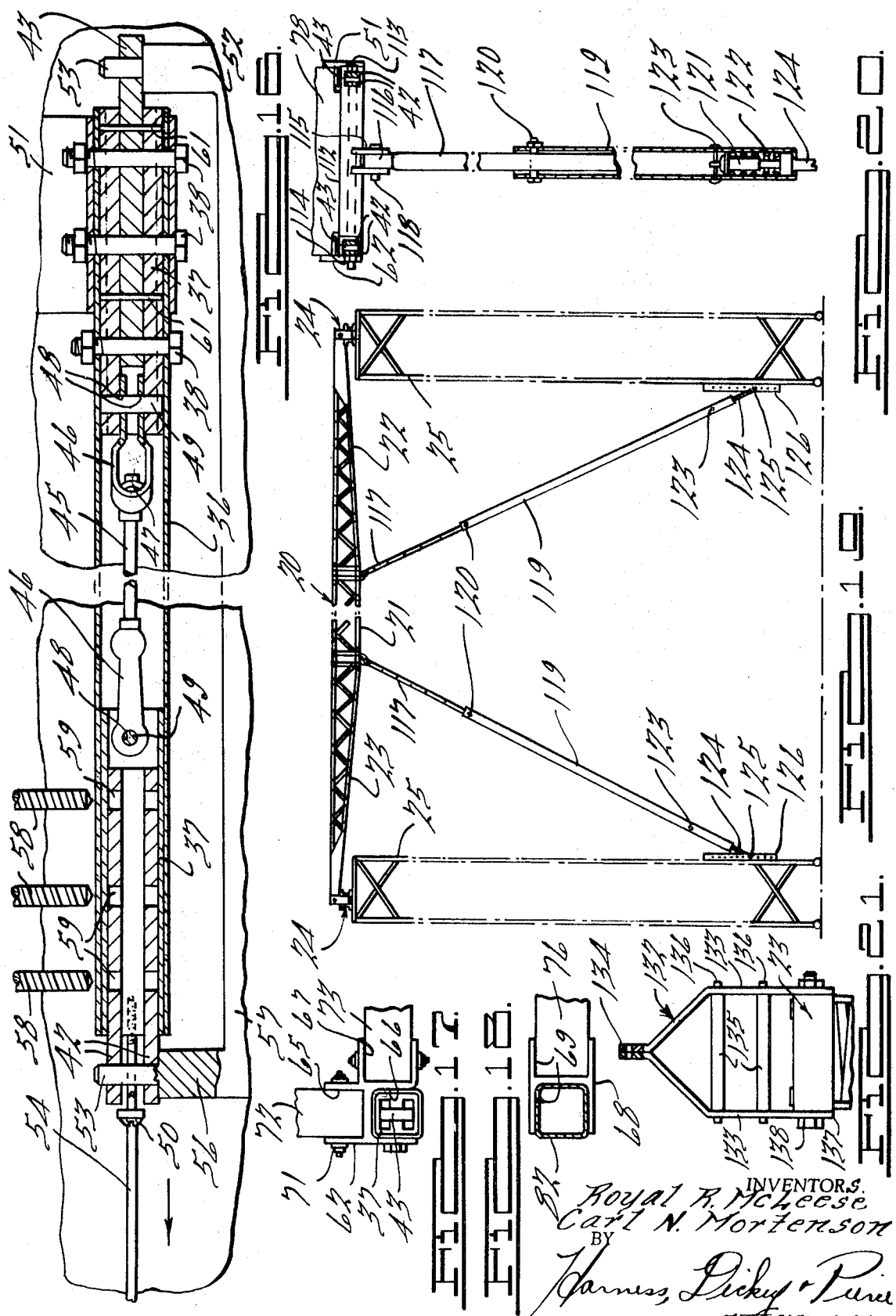

SECTIONAL SPANNING BEAM AND END SUPPORTS

BACKGROUND OF THE INVENTION

While spanning beams have been employed heretofore for use on the side of buildings, on towers and the like, there is no known art which can be pointed to for a disclosure of the beam of the present invention built up from sections of like tubing and reinforced by tensioned cables.

SUMMARY OF THE INVENTION

The invention pertains to a beam constructed in three or more sections from tubing of light material releasably connected together at the abutting ends and pivotally mounted on end supports. A central section has four parallel longitudinal runs with inner body members at the ends from which a single or a pair of spaced projecting links extend. The links contain an aperture through which bolts extend when in nested relation for securing the sections together. The end sections have runs in continuation of the top runs of the central section and bottom runs which slope upwardly toward the ends to provide sections which taper to the ends. Fittings are riveted to the runs to which angularly disposed crossmembers between the top and bottom runs, between the two runs at the top and the two runs at the bottom are secured. The end sections are reinforced by tapered side plates and by U-shaped end caps which extend over the plates and are secured together by bolts. An aperture is provided at the ends of the end sections by which the ends of the beam are supported for pivotal movement, a certain amount of which will occur when the beam is loaded. Scaffolding is provided at the ends built up to form towers of desired height for supporting a cradle having uprights which receive the ends of the beam and to which the ends are pivotally secured. The beam ends can be supported on frames from a cable so that the beam can be suspended along the side of a building. When mounted on the towers, the beam will span machinery in a factory, seats in a theater, a swimming pool and the like, and when tow or more of the beams are employed a platform can be built thereon to provide a large working area for supporting the material and the workers. The towers are preferably mounted on wheels so that the beam or platform thereon may be advanced as the work progresses. Each of the lower runs of the sections has a cable passed therethrough tensioned to approximately 500 pounds to provide additional strength and safety to the construction. The towers herein illustrated are reinforced at the top by cradles having uprights between which the ends of the beam extend and to which they are pivotally secured. Sockets can be applied to the runs to which handrails are releasably supported.

BRIEF DESCRIPTION OF THE DRAWINGS

FIG. 1 is a view in elevation of a beam supported on towers embodying features of the present invention;

FIG. 2 is a plan view of the structure illustrated in FIG. 1;

FIG. 3 is an enlarged broken sectional view of the structure illustrated in FIG. 1, taken on the line 3-3 thereof;

FIG. 4 is an enlarged broken sectional view of the structure illustrated in FIG. 3, taken on the line 4-4 thereof;

FIG. 5 is an enlarged broken sectional view of the structure illustrated in FIG. 4, taken on the line 5-5 thereof;

FIG. 6 is an enlarged broken plan view of the structure illustrated in FIG. 2, showing the right-hand end section joined to the central section;

FIG. 7 is an enlarged sectional view of the structure illustrated in FIG. 6, taken on the line 7-7 thereof;

FIG. 8 is an enlarged sectional view of the structure illustrated in FIG. 6, taken on the line 8-8 thereof;

FIG. 9 is an enlarged sectional view of the structure illustrated in FIG. 8, taken on the line 9-9 thereof;

FIG. 10 is an enlarged sectional view of the structure illustrated in FIG. 1, taken on the line 10-10 thereof;

FIG. 11 is a perspective view of the left-hand end section of the beam joined to the left-hand of the central section thereof;

FIG. 12 is an enlarged sectional view of the structure illustrated in FIG. 1, taken on the line 12-12 thereof;

FIG. 13 is an enlarged broken sectional view of the structure illustrated in FIG. 12, taken on the line 13-13 thereof;

FIG. 14 is an enlarged broken sectional view of the structure illustrated in FIG. 12, taken on the line 14-14 thereof;

FIG. 15 is an enlarged broken sectional view of the structure illustrated in FIG. 12, taken on the line 15-15 thereof;

FIG. 16 is a sectional view of structure, similar to that illustrated in FIG. 8, showing tension being applied to the cable thereof;

FIG. 17 is an end view of the fitting illustrated in FIG. 9 applied to the run;

FIG. 18 is an end view of a fitting used on the ends of the runs of the end sections of the beam;

FIG. 19 is a reduced view of the structure illustrated in FIG. 1, with shock absorbers applied between the beam and towers;

FIG. 20 is an enlarged view of a shock absorber assembly illustrated in FIG. 19; and FIG. 21 is a view in elevation of a frame attachable to the ends of the beam when the beam is to be supported on a pair of cables.

DESCRIPTION OF THE PREFERRED EMBODIMENT

A beam 20, as illustrated in FIGS. 1 and 2, has a central section 21, a right-hand end section 22 and a left-hand end section 23. The ends of the end sections 22 and 23 are pivoted to a cradle 24 supported on towers 25 which may or may not have wheels 26 thereon. The towers can be built to any desired height and can be advanced to move the bridge to different positions. As illustrated in FIG. 3, the cradle 24 comprises two oppositely facing channel elements 28 spaced by pairs of uprights 29 which receive the ends of the beam therebetween. Three pairs of uprights 29 are illustrated with the beam supported on the central pair. Two of the beams may be supported in the two outer pair of the uprights 29 bridged by material to form a platform area. The cradle 24 is attached to the towers 25 by U-bolts 31 in the conventional manner to reinforce and tie the tower sections together. A rod or tube 32 secures the ends of the beam in pivotable relation to the cradles. This permits the sagging of the beam a slight amount under increased load.

The central section, as illustrated in FIG. 11, is made of four lengths of tubing, a top left run 33, a top right run 34, a left bottom run 35 and a right bottom run 36. These runs are made from light tubing and for the assembly herein shown the tube is approximately 1¾-inch square and is used throughout the construction the central as well as the end sections. It is to be understood, however, that larger or smaller tubes may be employed and that the crossmembers to the runs may be of different dimensions. The top runs 33 and 34 are compression runs while the bottom runs 35 and 36 are the tension runs. Each of the runs has an inner body member 37 at each end secured therein by bolts 38. The body members 37 have an H-shaped opening therethrough providing tow spaced openings 39 connected by a central opening 41 which is substantially twice the width as the openings 39. A pair of links 42 are disposed in the openings 39 to form a bifurcated end, as illustrated in FIG. 8, which receives a wider link 43 disposed in the opening 41 in a body member 37 to be joined thereto. The link 43 extends between the links 42 when the bridge sections are to be joined and are secured together by bolts 44 at the four corners thereof.

Before the runs are assembled, the bottom runs 35 and 36 are prestressed by a cable 45 secured to the inner body members 37, as illustrated in FIG. 16. The cable 45 has each end extended through U-shaped sockets 46 after which a ball sleeve 47 is applied to the ends. The arms of the sockets have an aperture 48 therethrough for receiving a pin 49 which extends through the body members 37 and secures the cable therebetween. The cable is approximately 5/16 inch in diameter and is prestressed to approximately half of the breaking stress of 9,800 pounds before the ball sleeves 47 are applied thereto. The body member 37 to be secured to the right-hand end of the run 35 or 36 has a link 43 secured in the opening 41 of the body member by pins 61. With the cable attached to the right-hand body member by the socket 46 and the pin 49, the socket 46 on the opposite end of the cable is engaged by a pull wire within the run and pulled into the run along with the fitting at the right-hand end thereof. After a pull wire is secured to the link 43, the left-hand socket 46 is further pulled to extend beyond the left-hand end of the run to expose the left-hand socket 46 so that the left-hand body member 37 can be secured thereto by a pin 49. Thereafter, the right-hand body member 37 is pulled into a position where the apertures in the right-hand end of the run, the body member 37 and the link 43 are aligned for receiving the bolts 38 which clamps the body member 37, the link 43, the end of the run and a fitting 51 in firm fixed relation.

The projecting end of the link 43 is placed over a projecting jig pin 53 to securely anchor the end of the assembly thereto. The body member 37 on the left-hand end of the run has a pair of links 42 in the two spaced openings 39 therein and the ends of these links are placed over a second jig pin 53 to accurately space the apertures of the links 42 and 43 from each other. A pair of screws 50 are threaded into the end of the left-hand body member 37 and a pull rod 54 secured thereto draws the body member to the left until a predetermined load is registered on the cable which, in the present instance, is approximately 500 pounds. Thereafter, the drills 58 are advanced to drill apertures through the run wall and the left-hand body member 37 in exact alignment with the apertures 59 provided through the pair of links 42. The fitting 51 and bolts 38 are applied to the left-hand end of the run after the withdrawal of the drills 58 and when the bolts are tightened the pull rod 54 is disconnected and the stressed cable applies a 500-pound load between the members 37 at opposite ends of the runs.

A similar method of construction is employed when applying a cable 45 to runs 81 or 82 of the end sections 22 and 23, with the exception that the links 42 or 43 are omitted at the outboard ends of the sections. The left-hand section 22, illustrated in FIG. 8, has the right-hand socket 46 pulled into the run from the left-hand end thereof along with the left-hand body member 37 which has the link 43 fixed thereto by the pins 61. A return pull wire is secured to the link 43 of the left-hand body member 37 and is drawn some distance within the run to expose the socket 46 at the right-hand end thereof. The right-hand body member is secured to the socket 46 by the pin 49 and moved into the right-hand end of the run when the left-hand body member 37 is returned to the left-hand end of the run to have the apertures 59 disposed in aligned relation so that the bolts 38 can secure it and an end fitting 62 in firm fixed relation to the run. The link 43 is then placed over a jig pin 53 of a fixture and the opposite end of the run is located adjacent to another jig pin 53 of a fixture spaced a predetermined distance from the first said jig pin. Screws 50 are secured in the right-hand body member 37 and a pull rod 54 attached thereto pulls the right-hand body outwardly within the right-hand end of the run until a desired load is registered whereupon the drills, which are accurately located relative to the right-hand jig pin, drill holes through the end of the run and the body member 37 for the bolts 38 which clamp the body member and a fitting 68 in firm fixed relation to the right-hand end of the run. Thereafter, the pull rod 54 and screws 50 are moved and the stressed cable 45 retains a 500-pound load between the two body members 37.

With this arrangement, the apertures in the links 42 and 43 are accurately spaced in the lower runs having the stressed cables. The upper links, the body member and the ends of the upper runs are all jig-drilled to accurately space the apertures of the links 42 and 43 when the bolts 38 are applied to the ends of the runs. The cables provide safety to the beam sections, provide structural strength and dampen the vibration or springboard effect to the assembled sections.

A plurality of fittings are then secured to the runs 33, 34, 35 and 36. The fittings, illustrated in FIGS. 17 and 18, are placed in staggered relation to each other from opposite sides and top and bottom runs. The fitting 64 of FIG. 17 is an extruded length having three channel openings 65, 66 and 67 therein of a dimension to receive the tube. In FIG. 18, an extruded fitting 68 is illustrated of H-shape having oppositely disposed channel openings 69 for the tube. The fittings 68 are employed at or near the ends of the right and left-hand sections 22 and 23 where tube sections between the top and bottom runs are not employed. The fitting 64 can be applied with the channel openings 66 thereof moved downwardly over the run, as illustrated in FIG. 9, or it may be applied to the run from the inside with the opening 66 facing outwardly to leave the outer face of the runs near the ends of the end sections free of any protuberances. The fittings are secured to the runs by blind rivets 71, such as the Huck type rivet, the rivets being applied to opposite walls of the runs.

A section of tubing 72 connects the top and bottom runs 33, 35, 34 and 36 secured in position by the rivets 71. Tube sections 73 connect the ends of the runs 33 and 34, and 35 and 36 together, being secured by the blind rivets 71. A section 74 of the tubing interconnects the fitting 51 to the fitting 64 by blind rivets 71. The fitting 64 on the run 35 is aligned with the fitting 64 on the run 34 so that a tube section 75 secured to the fitting 51 on the run 33 is in crossed relation with the tube section 74 extending between the runs 34 and 36. Additional sections 74 of the tube spaces the two runs 34 and 36 and the two runs 33 and 35 throughout their length until at the ends the tube sections 72 and 73 are applied. The tube sections are in V-relation to each other throughout the length of the runs and in X-relation to each other at the top and bottom and at opposite sides. The bottom runs 35 and 36 have a tube section 77 extending from the fitting 51 to the opening 67 of the fitting 64. Tubular sections 76 are connected to the remaining portion of the runs 35 and 36 with a section 77 at the end and with sections 72 and 73 forming a rectangular frame at the right-hand end of the section. A plate 78 forms a bulkhead at the ends of the central section and retains the ends of the runs accurately positioned relative to each other. All of the four corners of the left-hand end of the central section has a link 43 extending therefrom while all four corners of the right-hand end of the central section has the two links 42 extending therefrom in bifurcated relation for receiving the links 43 on the left-hand end of the right-hand end section 22 of the beam. When the sections are to be assembled together, as illustrated in FIGS. 1, 6 and 11, the bolts 44 extend through the aligned opening of the links 43 at the left-hand end of the central section 21 and the links 42 at the right-hand end of the section 23. The links 42 at the right-hand end of the central section 21 are secured by bolts 44 to the links 43 at the left-hand end of the end section 22 to secure the three sections in fixed relation to each other. The end sections 22 and 23 are similarly constructed to provide like sections which are tapered, the left-hand end section 23 having the links 42 on the end adjacent to the central section while the end section 22 has the single links 43 on the end which abuts the central section. With this arrangement, the end sections 22 and 23 can be secured together without the central section 21 therebetween.

Each of the lower runs 81 and 82, as illustrated in FIG. 8, have the tensioned cable 45 therein, applied thereto in the manner pointed out hereinabove. The end of each section 22 and 23 adjacent to the central section 21 has the tube sections 72 and 73 secured to the fittings 51 and 62 attached to the ends of the runs 81 and 82, 83 and 84 by bolts 38 which secure the inner body members 37 therein. The tube sections 74 are secured between the fittings 64 on the runs 81 and 83 while the tubular sections 76 are secured by the fittings between the top runs 83 and 84 and the bottom runs 81 and 82. In view of the tapered relation of the bottom runs 81 and 82 with the top runs 83 and 84, the tubular sections 74 become shorter in length and are tilted at a greater angle as they approach the end of the sections, as illustrated in FIG. 1. The tubular side sections 74 are omitted beyond the tubular section 85 and a plate 86 is riveted to the sides of the runs 81 and 83 and 82 and 84 at the outboard ends thereof. The plates have large apertures 80 which extend over the heads of the bolts 38 which retain the body members 37 locked within the ends of the runs with the cable 45 stressed therebetween. A U-shaped plate 87 covers the ends of the runs and extends over the plates 86 having apertures 80 therein which receive the heads of the bolts 38. An aperture 88 is provided through the side portions of the U-shaped plate 87 and the plates 86 for receiving the supporting tube 32 which may have a head at one end and securing means at the other. The extending side portions firmly engage the plates 86 and are clamped together by through bolts 40 which also extend through the runs, the body members 37 and fittings. The tube sections 73 are riveted to the web of the U-shaped plate 87 and then to the fittings 68 to lock the elements of the outboard end of the end sections in firm fixed relation. As illustrated in FIG. 1, plates 89 are riveted to the plates 86 having an aperture 88 extending therethrough disposed substantially the same distance from the bottom runs 81 and 82. Any one of the three apertures 88 may be employed for receiving the tube 32 to change the length of the beam between the towers 25 and to position the beam at slightly different heights.

It will be noted in FIGS. 5 and 7 that U-shaped sockets 90 and 91 for a handrail are applied over the runs, those at the plates 86 having arms 92 extending through elongated slots 93 in the plates. The arms 92 of the sockets 91 have a square hole 95 for receiving a square tube 96 which extends therethrough and forms the upright or stanchion of the handrail. The top arm 92 of the sockets 90 on the bottom runs of the sections has a square hole 95 therethrough while the bottom arm 92 thereof forms a platform on which the bottom ends of the stanchions are supported. The U-shaped sockets 90 and 91 have the arms 92 spaced apart by tubular sections 98 against which the arms are retained by bolts 99. By using the tubular sections 98 the sockets are free to adjust themselves along the runs so as not to bind when the beam flexes. The sockets 90 and 91 are preferably made of steel so as to have substantial strength and the stanchions 96 have the lower section reinforced by an inner reinforcing element 101. The elements 101 are located adjacent to the apertures 95 of the socket element 91 on the upper runs to prevent the stanchions from bending or collapsing when a load is applied at the top of the handrail. One or two handrail sections 102 may be provided for the right-hand beam section 22, one or two handrail sections 103 may be provided for the central beam section 21 and one or two handrail sections 104 may be provided for the left-hand beam section 23.

The sections are made in the manner illustrated in FIGS. 12 to 15, where the stanchions 96 with the reinforcing element 101 therein have U-shaped elements 105 secured to the top thereof. Arms 106 of the elements 105 are secured to the end stanchions by rivets 71 and to the central stanchion by bolts 100. A top rail 107 is secured by rivets 71 to the arms 106 of the elements 105. Plates 94 are secured by rivets 71 to the midportion of the stanchions for supporting intermediate rails 97 which are secured to the plates 94 by rivets 71. The upper runs 33 and 34 and 83 and 84 of the beam sections 21, 22 and 23 are provided with the sockets 91 having apertures 95 in the arms 92. The lower runs 35, 36, 81 and 82 of the three-beam sections have the sockets 90 applied thereto containing an aperture 95 only in the upper arm 92 thereof, the lower arms of the sockets form a platform, as pointed out above. By applying the sockets to all of the runs, the handrail may be employed at both sides. The stanchions are shown on the inside of the run and they will be spaced a greater distance apart when the sockets have the arms extending outwardly so that the stanchions will be supported on the outside of the runs. When two or more of the beams are employed to support a platform, the handrails can be applied on the outer sides of the outermost beams. While the handrails are described as being separate elements, it will be noted in FIG. 1 that chains 109 pivoted to one set of plates 94 on one section and hooked over a bolt on a set of plates 94 on the other section connect the rails 97 of the adjacent handrail sections.

The ends of the rails 97 are secured to the set of plates 94 on the end stanchions 96 by bolts 100. Similar bolts 100 connect the top rail to the central stanchions 96. When the bolts are removed the top rail 107 with the end stanchions 96 pivoted thereto are separated from the central stanchions and rails 97 to permit the end stanchions to fold against the top rail to reduce the area occupied thereby. In the same manner, the stanchions 96 and the rails 97 may be folded relative to each other to reduce the width and length occupied thereby. The bulkheads 78 have a large aperture 63 therein which provides an opening into the interior of the sections 21, 22 and 23 which permits the folded handrail sections and the shock absorber braces and other elements to be housed when the sections are stored or shipped. It is only necessary to extend the end stanchions 96 from the top rail 107, unfold the central section and join the two sections together with the bolts 100 at points 111, illustrated in FIG. 1, to provide a rigid handrail. The handrails of the central and end section are similarly constructed and differ only in having the chains 109 pivoted to the central section or to the end sections.

In FIGS. 19 and 20, damping members are illustrated which are applicable to the beam at the junction between the central and end section. A tubular element 112 is of a length to extend between the links 42 at the junction between the central and end sections 21, 22 and 23. A bolt 113 passes through the apertures of the links 42 and 43 at the bottom corner of the joined sections and through the tube 112 secured in position by a nut 114. The tube has a pair of spaced arms 115 to which an eye 116 of a tube 117 is secured by a bolt 118. A tube 119 telescopes over the tube 117 which is adjustable inwardly and outwardly thereof and secured in adjusted position by a bolt 120 passing through an aperture near the end of the tube 119 and one of a series of apertures in the tube 117. The lower end of the tube 119 contains a shock absorber 121 of the load leveler type having a spring 122 on the outside thereof which is procurable from Monroe Auto Equipment Company of Monroe, Michigan. The upper end of the assembly is secured within the bottom end of the tube 119 by a rivet 123 passing through an eye in the inner end thereof. The eye 124 on the outer end of the shock absorber assembly is secured by a bolt 125 to one of a plurality of apertures in a channel member 126 attached to the tower 25 adjacent to the bottom thereof. The tubes 117 and 119 are adjusted relative to each other and to the channel member 126 to have the load at the junction between the sections 21 and 22 and 21 and 23 taken by the springs 122 and any movement from additional loads dampened by the shock absorbers 121.

In FIG. 21, a frame 132 is illustrated made of a pair of strips 133 joined together at the top 134 and spaced by sections of tube 135 retained in position by bolts 136. The bottom ends 137 of the strips 133 receive the U-shaped plate 87 at the ends of the beam to which the frames are secured by a bolt 138 which extends through the apertures 88 at the beam ends. The upper end of the frame 132 has an aperture to which a cable is secured so that the beam can be employed on the inner or outer faces of a building. In place of the frames 132 motor-driven winches may be secured to the ends of the beam by the bolts 138. The beam and towers are easily assembled, the towers are first erected to a desired height with the cradles reinforcing and connecting them together at the top. The three sections of the beam are connected together and if no crane or other lifting means is provided, pulleys may be used at the top of the towers for raising the ends of the beams thereto so that they can be secured to the cradle by the tube or rod 32. If handrails are to be applied, the sockets therefor can be placed in position before the beam is raised or these can be applied after the raising operation. The towers preferably have wheels so that they can be advanced as the work progresses and when two or more of the beams are employed, a substantial size platform can be built thereon for supporting the workmen and their supplies.

The assembled structure can be stabilized by the use of shock absorbers which can be adjusted relative to the load so as to prevent a springboard effect from occurring when loads are applied to the beam. The beam is of extremely light construction, all the parts thereof being made from an aluminum alloy of light weight. The tubes are of large cross section to provide strength and to resist collapse. The runs at the bottom of the section are tensioned by a preloaded cable which adds substantial safety to the overall construction so that even if a run of the section is cut or bent, the tension of the cable will prevent any major damage occurring to the structure or to the occupants thereof. The beam is of aircraft-type construction made of light aircraft-type material to provide high strength to each of the sections.

The central and end sections are joined together quickly and easily at the place where they are to be used and when two central sections are employed, a span of 70 feet is obtained. When a short span is desired, the two end sections are joined together to provide a span having an overall length of approximately 30.5 feet. The two end sections and the one central section herein illustrated, provides an overall length of approximately 52.5 feet. By the use of the cradle for supporting the ends of the beams no central bracing is required and no specific or special type of tower need by employed.

We claim:

1. In a bridge member, spaced tubular bottom runs on said member of uniform wall thickness throughout the length thereof, inner body members within the ends of the runs, a cable in each bottom run anchored to the facing ends of the members therein, means for securing one of said body members to end of the run, means for securing the other bottom member to the other end of the run after the cable is stressed, angularly disposed tube sections spacing the two prestressed runs apart, angularly disposed tube sections extending upwardly from the runs, top runs supported on the ends of the upwardly extending sections, and angularly disposed tube sections spanning the top runs for spacing them a predetermined distance apart.

2. In a bridge member as recited in claim 1, wherein fittings have three channel openings in which a run and two tube sections are secured.

3. In a bridge member as recited in claim 2, wherein the fittings, tube sections and the runs are secured together by blind rivets.

4. In a bridge member as recited in claim 1, wherein the inner body members contain an H-shaped slot, the side portions being narrow for receiving a pair of thin links, the cross portion being substantially wider for receiving a thick link.

5. In a bridge member as recited in claim 4, wherein fixture means retain the links an exact distance apart as one body member is moved relative to the other fixed body member to stress the cable, and means thereafter for securing the moved body member to said run.

6. In a bridge member as recited in claim 4, wherein the runs are in parallel relation to each other forming a central section.

7. In a bridge member as recited in claim 6, wherein a plate is secured to the ends of the section for accurately locating the runs and the links projecting therefrom.

8. In a bridge member as recited in claim 4, wherein the bottom runs slope upwardly to form tapered end sections.

9. In a bridge member as recited in claim 8, wherein a pair of the end sections can be secured together to provide a short bridge member, and bolts for joining the links of the sections together.

10. In a bridge member as recited in claim 9, wherein a central section is secured between the two end sections to provide a bridge member of greater length.

11. In a bridge member as recited in claim 9, wherein a plurality of connected central sections are secured between the end sections to provide a bridge member of substantially greater length.

12. In a bridge member as recited in claim 7, wherein plate members are supported on the sides of the thinner ends of the end sections having aligned apertures therethrough, cradles having upstanding members with aligned apertures, between which the apertured ends are disposed, and means extending through the apertures for pivoting the section ends on the cradles.

13. In a bridge member as recited in claim 12, wherein the upstanding ends of the cradle are supported on crossmembers, and towers to which the crossmembers are secured for bracing and adding strength thereto.

14. In a bridge member as recited in claim 13, wherein shock absorbers are connected between the inner ends of the end sections and the bottom of the towers to stabilize the beam member.

15. In a bridge member as recited in claim 8, wherein the tapered end sections thereof have aligned apertures, frame members provided with spaced-apart ends for spanning the bridge member ends, said spread-apart ends having an aperture, and means for connecting the apertures of the frame to those at the end of the bridge member for pivotally supporting the ends of the bridge members on the frames.

16. In a bridge member as recited in claim 1, wherein sockets are slidably attached to the runs for supporting a handrail for movement relative to the runs, said sockets being of U-shape having a web and two extending arms, the arms of the sockets applied to the top runs having tube-receiving apertures therethrough and those applied to the bottom run having a tube-receiving aperture in the top arm only.

17. In a bridge member as recited in claim 16, wherein handrails are provided for each section embodying a plurality of stanchions, U-shaped elements secured to the top of the stanchions for pivotal movement relative thereto, a tubular handrail secured to the U-shaped elements, pairs of plates on the stanchion below the top thereof, and rail members pivoted between the ends of said plates.

18. In a bridge member made up of two or more sections of light tubular construction having longitudinal extending tubular runs at the four corners with the ends aligned with the ends of the runs of an adjacent section, like attaching links extending from the ends of the runs at both ends of the sections, the links at one end of the section being disposed in spaced pairs, a single link extending at the other end of the section of a thickness substantially equal to twice the thickness of that of one of said pair of links, and a plate secured to each end of the section containing cutout corners which when in secured position accurately locate the ends of the runs and the projecting links so that those on the adjacent ends of the two sections will be in alignment with each other.

19. In a bridge member as recited in claim 18, wherein the end section has a plate on each side of the thinner end, and a U-shaped end member closing the end and extending over the plates, the plates and end member having aligned apertures therethrough by which the ends are pivotally supported.